United States Patent
Bauer et al.

(10) Patent No.: US 6,730,440 B1
(45) Date of Patent: May 4, 2004

(54) COMPOSITE BODY SUITABLE FOR UTILIZATION AS A LITHIUM ION BATTERY

(75) Inventors: Stephan Bauer, Ostercappeln (DE); Bernd Bronstert, Otterstadt (DE); Helmut Möhwald, Annweiler (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/958,343

(22) PCT Filed: Apr. 7, 2000

(86) PCT No.: PCT/EP00/03130

§ 371 (c)(1),
(2), (4) Date: Oct. 9, 2001

(87) PCT Pub. No.: WO00/62364

PCT Pub. Date: Oct. 19, 2000

(30) Foreign Application Priority Data

Apr. 9, 1999 (DE) .......................................... 199 16 043

(51) Int. Cl.⁷ ................................................ H01M 2/16
(52) U.S. Cl. .................... 429/249; 429/247; 429/231.9; 429/231.95; 429/304; 429/309; 429/306
(58) Field of Search ................................. 429/129, 304, 429/309, 306, 247, 249, 231.9, 231.95; 252/62.2; 428/304.4, 320.2, 322.2, 327, 411.1, 423.7, 424.6, 424.7, 424.8, 473.5, 474.4; 204/296; 521/27

(56) References Cited

U.S. PATENT DOCUMENTS 4,024,323 A    5/1977    Versteegh .................. 429/429

FOREIGN PATENT DOCUMENTS

| DE | 28 42 724 | 4/1979 |
|---|---|---|
| EP | 0 862 236 | 9/1998 |
| GB | 205 289 | 4/1979 |
| JP | 09 134 730 | 5/1997 |
| JP | 09 161 815 | 6/1997 |
| JP | 10 162 803 | 6/1998 |
| WO | WO 97/37397 | 10/1997 |
| WO | WO 97/44838 | 11/1997 |
| WO | WO 98/04015 | 1/1998 |
| WO | WO 99/19917 | 4/1999 |

OTHER PUBLICATIONS

Ullmann's Encyclopedia of Industrial Chemistry vol. A3 (1985) pp. 343–397.

*Primary Examiner*—Bruce F. Bell
(74) *Attorney, Agent, or Firm*—Keil & Weinkauf (57) ABSTRACT

A composite comprising:
  A) at least one separator layer Aa which comprises a mixture Ia, comprising a mix IIa consisting of:
    (a) from 1 to 95% by weight of a solid III having a primary particle size of from 5 nm to 20 μm; and
    (b) from 5 to 99% by weight of a polymeric composition IV;
  B) at least one cathode layer B which comprises an electron-conducting, electrochemically active compound which is able to release lithium ions on charging, and
  C) at least one anode layer C which comprises an electron-conducting, electrochemical compound which is able to take up lithium ions on charging.

24 Claims, 1 Drawing Sheet

COMPOSITE BODY SUITABLE FOR UTILIZATION AS A LITHIUM ION BATTERY

The present invention relates to composites which are suitable for, inter alia, electrochemical cells having electrolytes containing lithium ions; their use as, for example, lithium ion batteries, batteries, sensors, electrochromic windows, displays, capacitors and ion-conducting films comprising such a composite.

BACKGROUND OF THE INVENTION

Electrochemical, in particular rechargeable, cells are generally known, for example from "Ullmann's Encyclopedia of Industrial Chemistry", 5th Ed., Vol. A3, VCH Verlagsgesellschaft mbH, Weinheim, 1985, pages 343–397.

Among these cells, a special position is occupied by lithium batteries and lithium ion batteries, in particular as secondary cells, owing to their high specific energy storage density.

As described, for example, in the above citation from "Ullmann", the cathode of such cells comprises lithiated manganese, cobalt, vanadium or nickel mixed oxides which in the stoichiometrically simplest case can be described as $LiMn_2O_4$, $LiCoO_2$, $LiV_2O_5$ or $LiNiO_2$.

These mixed oxides react reversibly with compounds which can incorporate lithium ions into their lattice, for example graphite, with the lithium ions being removed from the crystal lattice and the metal ions such as manganese, cobalt or nickel ions present in the latter being oxidized. This reaction can be utilized in an electrochemical cell for storing electrical energy by separating the compound which takes up lithium ions, i.e. the anode material, and the lithium-containing mixed oxide, i.e. the cathode material, by means of an electrolyte through which the lithium ions migrate from the mixed oxide into the anode material (charging operation).

The compounds suitable for the reversible storage of lithium ions are usually fixed on collector electrodes by means of a binder.

When the cell is charged, electrons flow through an external voltage source and lithium cations flow through the electrolyte to the anode material. When the cell is used, the lithium cations flow through the electrolyte whereas the electrons flow through a load from the anode material to the cathode material.

To avoid a short circuit within the electrochemical cell, a layer which is electrically insulating but permeable to lithium cations is located between the two electrodes. This layer can be a solid electrolyte or a conventional separator.

In the production of many electrochemical cells, e.g. a lithium ion battery in the form of a round cell, the necessary battery films, i.e. cathode, anode and separator films, are combined using a rolling apparatus to produce a battery roll. In conventional lithium ion batteries, the cathode and anode film(s) are joined to collector electrodes in the form of, for example, an aluminum or copper foil. Such metal foils ensure sufficient mechanical stability.

In contrast, the separator film has to withstand the mechanical stresses on its own, which presents no problem in the case of conventional separator films based on, for example, polyolefins and having the conventional thickness. To further improve the mechanical stability of such conventional separator films, JP 09-134 730 and JP 09-161 815 propose joining these separator films to the anode and/or cathode film by means of a bonding layer.

In contrast to conventional separator films, the mechanical stability of separator films filled with a solid is generally not sufficient to ensure problem-free rolling of the films.

A composite which is able to withstand the mechanical stresses occurring in the manufacture of, for example, batteries is described in WO 99/19917 by the applicant. The composite claimed there comprises at least one layer which is filled with a solid, e.g. a separator layer, and at least one second layer which can be a cathode layer or an anode layer.

It is an object of the present invention to develop the composite claimed in WO 99/19917 further and to provide a composite which can be used directly as an electrochemical cell, in particular as a lithium ion battery, and can accordingly be introduced directly into an appropriate housing for such a cell or such a battery.

SUMMARY OF THE INVENTION

The present invention accordingly provides, in one embodiment, a composite comprising Aa) at least one separator layer Aa which comprises a mixture Ia, comprising a mix IIa consisting of
  a) from 1 to 95% by weight of a solid III, preferably a basic solid III, having a primary particle size of from 5 nm to 20 μm and
  b) from 5 to 99% by weight of a polymeric composition IV obtainable by polymerization of
    b1) from 5 to 100% by weight, based on the composition IV, of a condensation product V of
      α) at least one compound VI which is able to react with a carboxylic acid or a sulfonic acid or a derivative or a mixture of two or more thereof, and
      β) at least 1 mol per mol of the compound VI of a carboxylic acid or sulfonic acid VII which contains at least one free-radically polymerizable functional group, or a derivative thereof or a mixture of two or more thereof, and
    b2) from 0 to 95% by weight, based on the composition IV, of a further compound VIII having a mean molecular weight (number average) of at least 5000 and polyether segments in the main chain or a side chain,
  where the proportion by weight of the mix IIa in the mixture Ia is from 1 to 100% by weight,
  and the layer is free of an electron-conducting, electrochemically active compound, and B) at least one cathode layer B which comprises an electron-conducting, electrochemically active compound which is able to release lithium ions on charging, C) at least one anode layer C which comprises an electron-conducting, electrochemical compound which is able to take up lithium ions on charging.

The separator layer or layers Aa preferably comprise(s) a mixture Ia comprising a mix IIa consisting of
  a) from 1 to 95% by weight of a solid III, preferably a basic solid III, having a primary particle size of from 5 nm to 20 μm and
  b) from 5 to 99% by weight of a polymeric composition IV obtainable by polymerization of
    b1) from 5 to 100% by weight, based on the composition IV, of a condensation product V of
      α) a polyhydric alcohol VI which has carbon and oxygen atoms in the main chain, and
      β) at least 1 mol per mol of the polyhydric alcohol VI of a α,β-unsaturated carboxylic acid VII, and
    b2) from 0 to 95% by weight, based on the composition IV, of a further compound VIII having a mean molecular weight (number average) of at least 5000 and polyether segments in the main chain or a side chain, where the proportion by weight of the mix IIa in the mixture Ia is from 1 to 100% by weight.

In a further embodiment, the present invention provides a composite comprising

Ab) at least one first separator layer Ab which comprises a mixture Ib comprising a mix IIb consisting of a) from 1 to 95% by weight of a solid III, preferably a basic solid, having a primary particle size of from 5 nm to 20 µm and b) from 5 to 99% by weight of a polymer IX obtainable by polymerization of b1) from 5 to 75% by weight, based on the polymer IX, of a free-radically polymerizable compound X which is different from the carboxylic acid or the sulfonic acid VII or a derivative thereof, or a mixture of two or more thereof, and b2) from 25 to 95% by weight, based on the polymer IX, of a further compound VIII having a mean molecular weight (number average) of at least 5000 and polyether segments in the main chain or a side chain, where the proportion by weight of the mix IIb in the mixture Ib is from 1 to 100% by weight and the layer is free of an electron-conducting, electrochemically active compound, and at least one cathode layer B and at least one anode layer C, each as defined above.

The present invention further provides a composite comprising at least one separator layer Aa or at least one separator layer Ab or at least one separator layer Aa and at least one separator layer Ab,
at least one cathode layer B,
at least one anode layer C,
each as defined above, and D) at least one bonding layer D.

The respective layers of the composite of the present invention, which is preferably in the form of a film, are described in more detail below.

Separator Layer Aa/Ab

The term "solid III" encompasses all compounds which are solid under normal conditions and, during operation of the battery, can neither take up nor release electrons under the conditions prevailing during charging of batteries, in particular lithium ion batteries. Such solids are for the purposes of the present invention distinguished from the "electron-conducting, electrochemically active" compounds in the anode or cathode layer.

The solid III used in this layer is, first and foremost, an inorganic solid, preferably an inorganic basic solid, selected from the group consisting of oxides, mixed oxides, silicates, sulfates, carbonates, phosphates, nitrides, amides, imides and carbides of the elements of main groups I, II, III and IV and transition group IV of the Periodic Table; a polymer selected from the group consisting of polyethylene, polypropylene, polystyrene, polytetrafluoroethylene, polyvinylidene fluoride, polyamides, polyimides; a solids dispersion comprising such a polymer; and a mixture of two or more thereof.

Examples which may be mentioned are, in particular: oxides such as calcium oxide, silicon dioxide, aluminum oxide, magnesium oxide or titanium dioxide, mixed oxides, for example of the elements silicon, calcium, aluminum, magnesium, titanium; silicates such as ladder, chain, sheet and framework silicates, preferably wollastonite, in particular hydrophobicized wollastonite, sulfates such as alkali metal and alkaline earth metal sulfates; carbonates such as alkali metal and alkaline earth metal carbonates, e.g. calcium, magnesium or barium carbonate or lithium, potassium or sodium carbonate; phosphates such as apatites; nitrides; amides; imides; carbides; polymers such as polyethylene, polypropylene, polystyrene, polytetrafluoroethylene, polyvinylidene fluoride; polyamides; polyimides; or other thermoplastics, thermosets, microgels, solids dispersions, in particular those comprising the abovementioned polymers, and also mixtures of two or more of the abovementioned solids.

Furthermore, inorganic solids which conduct Li ions, preferably an inorganic basic solid which conducts Li ions, can be used according to the invention as solid III.

Examples are: lithium borates such as $Li_4B_6O_{11}*xH_2O$, $Li_3(BO_2)_3$, $Li_2B_4O_7*xH_2O$, $LiBO_2$, where x can be from 0 to 20; lithium aluminates such as $Li_2O*Al_2O_3*H_2O$, $Li_2Al_2O_4$, $LiAlO_2$; lithium aluminosilicates such as lithium-containing zeolites, feldspars, feldspar substitutes, phyllosilicates and inosilicates, and, in particular, $LiAlSi_2O_6$ (spodumene), $LiAlSi_4O_{10}$ (petullite), $LiAlSiO_4$ (eucryptite), mica such as $K[Li,Al]_3[AlSi]_4O_{10}(F—OH)_2/K[Li,Al,Fe]_3[AlSi]_4O_{10}(F—OH)_2$; lithium zeolites, in particular those in fiber, sheet or cube form, in particular those having the formula $Li_{2/z}O*Al_2O_3*xSiO_2*yH_2O$, where z corresponds to the valence, x is from 1.8 to about 12 and y is from 0 to about 8; lithium carbides such as $Li_2C_2$, $Li_4C$; $Li_3N$; lithium oxides and mixed oxides such as $LiAlO_2$, $Li_2MnO_3$, $Li_2O$, $Li_2O_2$, $Li_2MnO_4$, $Li_2TiO_3$; $Li_2NH$; $LiNH_2$; lithium phosphates such as $Li_3PO_4$, $LiPO_3$, $LiAlFPO_4$, $LiAl(OH)PO_4$, $LiFePO_4$, $LiMnPO_4$; $Li_2CO_3$; lithium silicates in ladder, chain, sheet and framework form, e.g. $Li_2SiO_3$, $Li_2SiO_4$ and $Li_6Si_2$; lithium sulfates such as $Li_2SO_4$, $LiHSO_4$, $LiKSO_4$; the Li compounds mentioned in the discussion of the cathode layer, with the presence of conductive black being ruled out when they are used as solid III; and also mixtures of two or more of the abovementioned solids which conduct Li ions.

Particularly suitable solids III are basic solids. For the purposes of the present invention, basic solids are those whose mixture with a liquid, water-containing diluent which itself has a pH of at most 7 has a higher pH than this diluent.

The solids are preferably very largely insoluble in the liquid used as electrolyte and electrochemically inert in the battery medium.

Particularly suitable solids are those which have a primary particle size of from 5 nm to 20 µm, preferably from 0.01 to 10 µm and in particular from 0.1 to 5 µm, where the particle sizes specified are determined by electron microscopy. The melting point of the solid is preferably above the operating temperature customary for the electrochemical cell; melting points of above 120° C., in particular above 150° C., have been found to be particularly useful.

In terms of their external shape, the solids can be symmetrical, i.e. have an aspect ratio height:width:length of about 1 and be in the form of spheres, granules, approximately round structures, but also in the form of any polyhedra such as cuboids, tetrahedra, hexahedra, octahedra or bipyramids, or can be distorted or asymmetric, i.e. have an aspect ratio height:width:length different from 1 and be in the form of needles, asymmetric tetrahedra, asymmetric bipyramids, asymmetric hexahedra or octahedra, platelets, disks or as fibers. If the solids are in the form of asymmetric particles, the abovementioned upper limit for the primary particle size relates in each case to the smallest axis.

As compound VI which is able to react with a carboxylic acid or a sulfonic acid VII or a derivative or a mixture of two or more thereof, it is possible in principle to use all compounds which fulfill this criterion.

The compound VI is preferably selected from the group consisting of monohydric or polyhydric alcohols having only carbon atoms in the main chain; monohydric or polyhydric alcohols whose main chain comprises at least two carbon atoms plus at least one atom selected from the group consisting of oxygen, phosphorus and nitrogen; silicon-containing compounds; amines having at least one primary amino group; amines having at least one secondary amino group; aminoalcohols; monohydric or polyhydric thiols; compounds containing at least one thiol group and at least one hydroxyl group; and mixtures of two or more thereof.

Among these, preference is in turn given to compounds VI containing two or more functional groups which can react with the carboxylic acid or sulfonic acid.

When compounds VI containing amino groups as functional group are used, preference is given to using those having secondary amino groups so that after condensation/crosslinking there are either absolutely no free NH groups or only small amounts thereof present in the mixture Ia.

Specific examples of preferred compounds are:

monohydric or polyhydric alcohols which have only carbon atoms in the main chain and have from 1 to 20, preferably from 2 to 20 and in particular from 2 to 10, alcoholic OH groups, in particular dihydric, trihydric and tetrahydric alcohols, preferably having from 2 to 20 carbon atoms, e.g. ethylene glycol, 1,2- or 1,3-propanediol, 1,2- or 1,3-butanediol, 1,4-butenediol or 1,4-butynediol, 1,6-hexanediol, neopentyl glycol, 1,2-dodecanediol, glycerol, trimethylolpropane, pentaerythritol or sugar alcohols, hydroquinone, novolak, bisphenol A; it is also possible, as can be seen from the above definition, to use monohydric alcohols such as methanol, ethanol, propanol, n-, sec- or tert-butyl, etc.; use can also be made of polyhydroxyolefins, preferably those having two terminal hydroxyl groups, e.g. $\alpha,\omega$-dihydroxybutadiene;

polyester polyols as are known, for example, from *Ullmanns Encyclopädie der technischen Chemie*, 4th edition, Volume 19, pp. 62–65 and are obtained, for example, by reaction of dihydric alcohols with polybasic, preferably dibasic, polycarboxylic acids;

monohydric or polyhydric alcohols whose main chain comprises at least two carbon atoms plus at least one oxygen atom, preferably polyether alcohols such as polymerization products of alkylene epoxides, for example isobutylene oxide, propylene oxide, ethylene oxide, 1,2-epoxybutane, 1,2-epoxypentane, 1,2-epoxyhexane, tetrahydrofuran, styrene oxide; use can also be made of polyether alcohols which are modified at the end groups, e.g. polyether alcohols modified by $NH_2$ end groups; these alcohols preferably have a molecular weight (number average) of from 100 to 5000, more preferably from 200 to 1000 and in particular from 300 to 800; such compounds are known per se and are commercially available, for example under the trade names Pluriol® or Pluronic® (BASF Aktiengesellschaft);

alcohols as defined above in which some or all carbon atoms are replaced by silicon; compounds of this type which can be used are, in particular, polysiloxanes or alkylene oxide-siloxane copolymers or mixtures of polyether alcohols and polysiloxanes as are described, for example, in EP-B 581 296 and EP-A 525 728; as regards the molecular weight of these alcohols, what has been said above also applies;

alcohols as defined above, in particular polyether alcohols, in which some or all oxygen atoms are replaced by sulfur atoms; with regard to the molecular weight of these alcohols, what has been said above likewise applies;

monohydric or polyhydric alcohols whose main chain comprises at least two carbon atoms plus at least one phosphorus atom or at least one nitrogen atom, e.g. diethanolamine and triethanolamine;

lactones which are derived from compounds of the formula $HO—(CH_2)_z—COOH$, where z is from 1 to 20, e.g. $\epsilon$-caprolactone, $\beta$-propiolactone, $\gamma$-butyrolactone or methyl-$\epsilon$-caprolactone;

silicon-containing compounds such as dichlorosilane or trichlorosilane, phenyltrichlorosilane, diphenyldichlorosilane, dimethylvinylchlorosilane;

silanols such as trimethylsilanol;

amines having at least one primary and/or secondary amino group, e.g. butylamine, 2-ethylhexylamine, ethylenediamine, hexamethylenediamine, diethylenetriamine, tetraethylenepentamine, pentaethylenehexamine, aniline, phenylenediamine;

polyetherdiamines such as 4,7-dioxydecane-1,10-diamine, 4,11-dioxytetradecane-1,14-diamine;

monohydric or polyhydric thiols, e.g. aliphatic thiols such as methanethiol, ethanethiol, cyclohexanethiol, dodecanethiol; aromatic thiols such as thiophenol, 4-chlorothiophenol, 2-mercaptoaniline;

compounds containing at least one thiol group and at least one hydroxyl group, e.g. 4-hydroxythiophenol and monothio derivatives of the abovementioned polyhydric alcohols;

amino alcohols such as ethanolamine, N-methylethanolamine, N-ethylethanolamine, N-butylethanolamine, 2-amino-1-propanol, 2-amino-1-phenylethanol, monoamino or polyamino polyols having more than two aliphatically bound hydroxyl groups, e.g. tris(hydroxymethyl)methylamine, glucamine, N,N'-bis(2-hydroxymethyl)ethylenediamine.

It is also possible to use mixtures of two or more of the above-defined compounds VI.

According to the present invention, the abovementioned compounds VI are condensed with a carboxylic acid or sulfonic acid VII which contains at least one free-radically polymerizable functional group or a derivative thereof or a mixture of two or more thereof, in which reaction at least one, preferably all, of the free groups capable of condensation within the compounds VI are condensed with the compound VII.

Carboxylic acids or sulfonic acids VII which can be used for the purposes of the present invention are in principle all carboxylic and sulfonic acids which contain at least one free-radically polymerizable functional group, and also their derivatives. The term "derivatives" used here encompasses both compounds which are derived from a carboxylic or sulfonic acid and in which the acid function is modified, e.g. esters, acid halides or acid anhydrides, and compounds which are derived from a carboxylic or sulfonic acid and in which the carbon skeleton of the carboxylic or sulfonic acid is modified, e.g. halocarboxylic or halosulfonic acids.

Examples of compound VII are, in particular:

$\alpha,\beta$-unsaturated carboxylic acids or $\alpha,\gamma$-unsaturated carboxylic acids.

Particularly suitable α,β-unsaturated carboxylic acids are those of the formula where
R$^1$, R$^2$ and R$^3$ are hydrogen or C$_1$–C$_4$-alkyl radicals; among these, preference is in turn given to acrylic acid and methacrylic acid; other suitable compounds are cinnamic acid, maleic acid, fumaric acid, itaconic acid or p-vinylbenzoic acid, and also derivatives thereof, e.g. anhydrides such as maleic anhydride or itaconic anhydride;

halides, in particular chlorides, such as acryloyl or methacryloyl chloride; esters such as (cyclo)alkyl(meth)acrylates having up to 20 carbon atoms in the alkyl radical, e.g. methyl, ethyl, propyl, butyl, hexyl, 2-ethylhexyl, stearyl, lauryl, cyclohexyl, benzyl, trifluoromethyl, hexafluoropropyl or tetrafluoropropyl (meth)acrylate, polypropylene glycol mono(meth)acrylates, polyethylene glycol mono(meth)acrylates, poly(meth)acrylates of polyhydric alcohols, e.g. glyceryl di(meth)acrylate, trimethylolpropane di(meth)acrylate, pentaerythrityl di- or tri-(meth)acrylate, diethylene glycol bis(mono(2-acryloxyethyl)carbonate), poly(meth)acrylates of alcohols which themselves in turn contain a free-radically polymerizable group, e.g. esters of (meth)acrylic acid and vinyl and/or allyl alcohol;

vinyl esters of other aliphatic or aromatic carboxylic acids, e.g. vinyl acetate, vinyl propionate, vinyl butyrate, vinyl hexanoate, vinyl octanoate, vinyl decanoate, vinyl stearate, vinyl palmitate, vinyl crotonate, divinyl adipate, divinyl sebacate, vinyl 2-ethylhexanoate, vinyl trifluoroacetate;

allyl esters of other aliphatic or aromatic carboxylic acids, e.g. allyl acetate, allyl propionate, allyl butyrate, allyl hexanoate, allyl octanoate, allyl decanoate, allyl stearate, allyl palmitate, allyl crotonate, allyl salicylate, allyl lactate, diallyl oxalate, diallyl malonate, diallyl succinate, diallyl glutarate, diallyl adipate, diallyl pimelate, diallyl cinnatricarboxylate, allyl trifluoroacetate, allyl perfluorobutyrate, allyl perfluorooctanoate;

β,γ-unsaturated carboxylic acids or their derivatives, e.g. vinylacetic acid, 2-methylvinylacetic acid, isobutyl 3-butenoate, allyl 3-butenoate, allyl 2-hydroxy-3-butenoate, diketene;

sulfonic acids such as vinylsulfonic acid, allylsulfonic and methylylsulfonic acids, and also their esters and halides, vinyl benzenesulfonate, 4-vinylbenzenesulfonamide.

It is also possible to use mixtures of two or more of the above-described carboxylic and/or sulfonic acids.

Specific examples of compound X which is capable of free-radical polymerization and can be used for preparing the polymer IX are:

olefinic hydrocarbons such as ethylene, propylene, butylene, isobutene, hexene or higher homologues and vinylcyclohexane;

(meth)acrylonitrile;

halogen-containing olefinic compounds such as vinylidene fluoride, vinylidene chloride, vinyl fluoride, vinyl chloride, hexafluoropropene, trifluoropropene, 1,2-dichloroethylene, 1,2-difluoroethylene and tetrafluoroethylene;

vinyl alcohol, vinyl acetate, N-vinylpyrrolidone, N-vinylimidazole, vinylformamide;

phosphonitrilic chlorides such as hexachloro (triphosphazene), and also derivatives thereof which are partially or completely substituted by alkoxy, phenoxy, amino and fluoroalkoxy groups, i.e. compounds which can be polymerized to form polyphosphazenes;

aromatic, olefinic compounds such as styrene, α-methylstyrene;

vinyl ethers such as methyl, ethyl, propyl, isopropyl, butyl, isobutyl, hexyl, octyl, decyl, dodecyl, 2-ethylhexyl, cyclohexyl, benzyl, trifluoromethyl, hexafluoropropyl and tetrafluoropropyl vinyl ether.

It is, of course, also possible to use mixtures of the above compounds X, resulting in copolymers in which the monomers are, depending on the method of preparation, distributed randomly or arranged in blocks.

Preference is here given to using polymers and copolymers of vinyl chloride, acrylonitrile, vinylidene fluoride, vinyl chloride and vinylidene chloride, vinyl chloride and acrylonitrile, vinylidene chloride with hexafluoropropylene, vinylidene fluoride with hexafluoropropylene and a member selected from the group consisting of vinyl fluoride, tetrafluoroethylene and a trifluoroethylene, as are described, for example, in U.S. Pat. No. 5,540,741 and U.S. Pat. No. 5,478,668 whose disclosures in this respect are fully incorporated by reference into the present application. Among these, preference in turn is given to copolymers of vinylidene fluoride (1,1-difluoroethene) and hexafluoropropene, more preferably random copolymers of vinylidene fluoride and hexafluoropropene, in which the proportion by weight of vinylidene fluoride is from 75 to 92% and that of hexafluoropropene is from 8 to 25%.

Both these compounds X and the condensation products V are polymerized by conventional methods well known to those skilled in the art, preferably polymerized by a free-radical mechanism; as regards the molecular weights obtained, what is said below for the compound VIII applies.

Suitable compounds VIII are, first and foremost, compounds having a mean molecular weight (number average) of at least 5000, preferably from 5000 to 20,000,000, in particular from 100,000 to 6,000,000, which are able to solvate lithium cations and function as binders. Examples of suitable compounds VIII are polyethers and copolymers which comprise at least 30% by weight of the following structural unit, based on the total weight of the compound VIII:

where
R$^1$, R$^2$, R$^3$ and R$^4$ are aryl groups, alkyl groups, preferably methyl groups, or hydrogen and can be identical or different and contain heteroatoms such as oxygen, nitrogen, sulfur or silicon.

Such compounds are described, for example, in: M. B. Armand et. al., Fast Ion Transport in Solids, Elsevier, N.Y., 1979, pp. 131–136, or in FR-A 7832976.

The compound VIII can also consist of a mixture of two or more such compounds.

The above-defined polymeric composition IV or the polymer IX can also be in the form of a foam, in which case the solid III is present as a dispersion therein.

The mixes IIa should, according to the present invention, consist of from 1 to 95% by weight, preferably from 25 to 90% by weight and in particular from 30 to 70% by weight, of a solid III and from 5 to 99% by weight, preferably from 10 to 75% by weight and in particular from 30 to 70% by weight, of a polymeric composition IV, and the compound VIII of the polymeric composition IV should advantageously have a mean molecular weight (number average) of from 5000 to 100,000,000, preferably from 50,000 to 8,000,000. The polymeric composition IV can be obtained by reacting from 5 to 100% by weight, preferably from 30 to 70% by weight, based on the polymeric composition IV, of a compound V with from 0 to 95% by weight, in particular from 30 to 70% by weight, based on the polymeric composition IV, of a compound VIII.

The mixes IIb should, according to the present invention, consist of from 1 to 95% by weight, preferably from 25 to 90% by weight and in particular from 30 to 70% by weight, of a solid III and from 5 to 99% by weight, preferably from 10 to 75% by weight and in particular from 30 to 70% by weight, of a polymer IX, and the compound VIII of the polymer IX should advantageously have a mean molecular weight (number average) of from 5000 to 100,000,000, preferably from 50,000 to 8,000,000. The polymer IX can be obtained by reacting from 5 to 75% by weight, preferably from 30 to 70% by weight, based on the polymer IX, of a compound X with from 25 to 95% by weight, in particular from 30 to 70% by weight, based on the polymer IX, of a compound VIII.

In the following, the mixtures Ia and Ib used according to the present invention and the mixes IIa and IIb used according to the present invention are discussed together and referred to as "mixture used according to the present invention" and "mix used according to the present invention" respectively.

To prepare the mixture used according to the present invention which should comprise a mix used according to the present invention in an amount of from 1 to 100% by weight, preferably from 35 to 100% by weight and in particular form 30 to 70% by weight, based on the mixture used according to the present invention, a mixture of a solid III, a condensation product V and, if desired, a compound VIII or a mixture of a solid III, a compound X, a compound VIII and customary additives such as plasticizers, preferably plasticizers comprising polyethylene oxide or polypropylene oxide, can be prepared.

Anode Layer B and Cathode Layer C

As polymeric binder in these layers B and C, use is made of the following polymers. The polymeric binders used in the layers B and C can be identical or different from one another. Particular mention may be made of:

1) Homopolymers, copolymers or block copolymers IVa (polymers IVa) obtainable by polymerization of the above-defined mixtures Ia or Ib.
2) Polycarbonates such as polyethylene carbonate, polypropylene carbonate, polybutadiene carbonate, polyvinylidene carbonate.
3) Homopolymers, copolymers and block copolymers prepared from
   a) olefinic hydrocarbons such as ethylene, propylene, butylene, isobutene, propene, hexene or higher homologues, butadiene, cyclopentene, cyclohexene, norbomene, vinylcyclohexane;
   b) aromatic hydrocarbons such as styrene and methylstyrene;
   c) esters of acrylic acid or methacrylic acid, e.g. methyl, ethyl, propyl, isopropyl, butyl, isobutyl, hexyl, octyl, decyl, dodecyl, 2-ethylhexyl, cyclohexyl, benzyl, trifluoromethyl, hexafluoropropyl or tetrafluoropropyl acrylate or methacrylate;
   d) acrylonitrile, methacrylonitrile, N-methylpyrrolidone, N-vinylimidazole, vinyl acetate;
   e) vinyl ethers such as methyl, ethyl, propyl, isopropyl, butyl, isobutyl, hexyl, octyl, decyl, dodecyl, 2-ethylhexyl, cyclohexyl, benzyl, trifluoromethyl, hexafluoropropyl or tetrafluoropropyl vinyl ether;
   f) halogen-containing olefinic compounds such as vinyl chloride, vinyl fluoride, vinylidene fluoride, vinylidene chloride, hexafluoropropene, trifluoropropene, 1,2-dichloroethene, 1,2-difluoroethene, tetrafluoroethene.
4) Polyurethanes, for example obtainable by reacting
   a) organic diisocyanates having from 6 to 30 carbon atoms, for example aliphatic acyclic diisocyanates such as hexamethylene 1,5-diisocyanate and hexamethylene 1,6-diisocyanate, aliphatic cyclic diisocyanates such as cyclohexylene 1,4-diisocyanate, dicyclohexylmethane diisocyanate and isophorone diisocyanate or aromatic diisocyanates such as tolylene 2,4-diisocyanate, tolylene 2,6-diisocyanate, m-tetramethylxylene diisocyanate, p-tetramethylxylene diisocyanate, tetrahydronaphthylene 1,5-diisocyanate and diphenylmethane 4,4'-diisocyanate or mixtures of such compounds, with
   b) polyhydric alcohols such as polyesterols, polyetherols and diols.
   The polyesterols are advantageously predominantly linear polymers having terminal OH groups, preferably those having two or three, in particular two, OH end groups. The acid number of the polyesterols is less than 10 and preferably less than 3. The polyesterols can be prepared in a simple manner by esterification of aliphatic or aromatic dicarboxylic acids having from 4 to 15 carbon atoms, preferably from 4 to 6 carbon atoms, with glycols, preferably glycols having from 2 to 25 carbon atoms, or by polymerization of lactones having from 3 to 20 carbon atoms. Examples of dicarboxylic acids which can be used are glutaric acid, pimelic acid, suberic acid, sebacic acid, dodecanoic acid and preferably adipic acid and succinic acid. Suitable aromatic dicarboxylic acids are terephthalic acid, isophthalic acid, phthalic acid or mixtures of these dicarboxylic acids with other dicarboxylic acids, e.g. diphenic acid, sebacic acid, succinic acid and adipic acid. The dicarboxylic acids can be used individually or as mixtures. To prepare the polyesterols, it may be advantageous to use the corresponding acid derivatives such as carboxylic anhydrides or carboxylic chlorides in place of the dicarboxylic acids. Examples of suitable glycols are diethylene glycol, 1,5-pentanediol, 1,10-decanediol and 2,2,4-trimethylpentane-1,5-diol. Preference is given to using 1,2-ethanediol, 1,3-propanediol, 2-methylpropane-1,3-diol, 1,4-butanediol, 1,6-hexanediol, 2,2-dimethylpropane-1,3-diol, 1,4-dimethylolcyclohexane, 1,4-diethanolcyclohexane and ethoxylated or propoxylated products of 2,2-bis (4-hydroxyphenyl)propane (bisphenol A). Depending on the desired properties of the polyurethanes, the polyols can be used alone or as a mixture in various mixing ratios. Suitable lactones for preparing the polyesterols are, for example, α,α-dimethyl-β-propiolactone, γ-butyrolactone and preferably ε-caprolactone.

The polyetherols are essentially linear substances having terminal hydroxyl groups and containing ether bonds. Suitable polyetherols can easily be prepared by polymerization of cyclic ethers such as tetrahydrofuran or by reacting one or more alkylene oxides having from 2 to 4 carbon atoms in the alkylene radical with an initiator molecule containing two active hydrogen atoms in bound form in the alkylene radical. Examples of suitable alkylene oxides are ethylene oxide, 1,2-propylene oxid, epichlorohydrin, 1,2-butylene oxide and 2,3-butylene oxide. The alkylene oxides can be used individually, alternately in succession or as a mixture. Suitable initiator molecules are, for example, water, glycols such as ethylene glycol, propylene glycol, 1,4-butanediol and 1,6-hexanediol, amines such as ethylenediamine, hexamethylenediamine and 4,4'-diaminodiphenylmethane and aminoalcohols such as ethanolamine. Suitable polyesterols and polyetherols and their preparation are described, for example, in EP-B 416 386; suitable polycarbonatediols, preferably those based on 1,6-hexanediol, and their preparation are described, for example, in U.S. Pat. No. 4,131,731.

Use can advantageously be made of up to 30% by weight, based on the total mass of the alcohols, of aliphatic diols having from 2 to 20, preferably from 2 to 10, carbon atoms, e.g. 1,2-ethanediol, 1,3-propanediol, 1,4-butanediol, 1,6-hexanediol, 1,5-pentanediol, 1,10-decanediol, 2-methylpropane-1,3-diol, 2,2-dimethylpropane-1,3-diol, 2-methyl-2-butylpropane-1,3-diol, 2,2-dimethylbutane-1,4-diol, 1,4-dimethylolcyclohexane, neopentyl glycol hydroxypivalate, diethylene glycol, triethylene glycol and methyldiethanolamine or aromatic-aliphatic or aromatic-cycloaliphatic diols having from 8 to 30 carbon atoms where possible aromatic structures are heterocyclic ring systems or preferably isocyclic ring systems, for example naphthalene or, in particular, benzene derivatives such as bisphenol A, symmetrically diethoxylated bisphenol A, symmetrically dipropoxylated bisphenol A, higher ethoxylated or propoxylated bisphenol A derivatives or bisphenol F derivatives, and also mixtures of such compounds.

Use can advantageously be made of up to 5% by weight, based on the total mass of the alcohols, of aliphatic triols having from 3 to 15, preferably from 3 to 10, carbon atoms, for example trimethylolpropane or glycerol, the reaction product of such compounds with ethylene oxide and/or propylene oxide, and also mixtures of such compounds.

The polyhydric alcohols may bear functional groups, for example neutral groups such as siloxane groups, basic groups such as, in particular, tertiary amino groups or acid groups or their salts or groups which are easily converted into acid groups; these groups are introduced via a polyhydric alcohol. Preference is given to using diol components which bear such groups, e.g. N-methyldiethanolamine, diethyl N,N-bis(hydroxyethyl)aminomethylphosphonate or 3-sulfopropyl N,N-bis(hydroxyethyl)-2-aminoacetate, or dicarboxylic acids which bear such groups and can be used for the preparation of polyesterols, for example 5-sulfoisophthalic acid.

Acid groups are, in particular, the phosphoric acid, phosphonic acid, sulfuric acid, sulfonic acid, carboxyl or ammonium group.

Groups which are easily converted into acid groups are, for example, ester groups or salts, preferably of the alkali metals such as lithium, sodium or potassium.

5) The above-described polyesterols themselves; care should be taken to ensure that molecular weights in the range from 10,000 to 2,000,000, preferably from 50,000 to 1,000,000 are obtained.

6) Polyamines, polysiloxanes and polyphosphazenes, in particular those which have already been discussed in the description of the polymer IVb.

7) Polyetherols as have been described, for example, in the above discussion of the polymer IVa as compound IX or in the discussion of the polyurethanes.

The cathode layer C comprises an electron-conducting, electrochemically active compound customarily used for cathodes (cathode compound) which is able to take up electrons on charging, preferably a lithium compound. Particular examples which may be mentioned are:

$LiCoO_2$, $LiNiO_2$, $LiNi_xCO_yO_2$, $LiNi_xCO_yAl_zO_2$, where $0<x,y,z \leq 1$, $Li_xMnO_2(0<x \leq 1)$, $Li_xMn_2O_4(0<x \leq 2)$, $Li_xMoO_2(0<x \leq 2)$, $Li_xMnO_3(0<x \leq 1)$, $Li_xMnO_2(0<x \leq 2)$, $Li_xMn_2O_4(0<x \leq 2)$, $Li_xV_2O_4(0<x \leq 2.5)$, $Li_xV_2O_3(0<x \leq 3.5)$, $Li_xVO_2(0<x \leq 1)$, $Li_xWO_2(0<x \leq 1)$, $Li_xWO_3(0<x \leq 1)$, $Li_xTiO_2(0<x \leq 1)$, $Li_xTi_2O_4$ $(0<x \leq 2)$, $Li_xRuO_2(0<x \leq 1)$, $Li_xFe_2O_3(0<x \leq 2)$, $Li_xFe_3O_4(0<x \leq 2)$, $Li_xCr_2O_3$ $(0<x \leq 3)$, $Li_xCr_3O_4(0<x \leq 3.8)$, $Li_xV_3S_5(0<x \leq 1.8)$, $Li_xTa_2S_2(0<x \leq 1)$, $Li_xFeS(0<x \leq 1)$, $Li_xFeS_2(0<x \leq 1)$, $Li_xNbS_2(0<x \leq 2.4)$, $Li_xMoS_2(0<x \leq 3)$, $Li_xTiS_2(0<x \leq 2)$, $Li_xZrS_2(0<x \leq 2)$, $Li_xNbSe_2(0<x \leq 3)$, $Li_xVSe_2(0<x \leq 1)$, $Li_xNiPS_2(0<x \leq 1.5)$, $Li_xFePS_2(0<x \leq 1.5)$.

The anode layer C comprises a customary electron-conducting electrochemically active compound known from the prior art (anode compound) which is able to release electrons on charging; particular examples which may be mentioned are: lithium, lithium-containing metal alloys, micronized carbon black, natural and synthetic graphite, synthetic graphitized carbon powder and carbon fibers, oxides such as titanium oxide, zinc oxide, tin oxide, molybdenum oxide, tungsten oxide, carbonates such as titanium carbonate, molybdenum carbonate and zinc carbonate.

The anode layer C further comprises up to 30% by weight, based on the total weight of materials present in it (polymeric binder plus anode compound), of conductive black and, if desired, customary additives. The cathode layer B comprises, based on the total weight of the materials present in it (polymeric binder plus cathode compound), from 0.1 to 20% by weight of conductive black.

Bonding Layer D

As bonding layer D, it is possible in principle to use all materials which are able to join the first layer or layers, as defined above, and the second layer or layers, as defined above, to one another.

The bonding layer is, in particular if the layers in question are joined to one another by hot lamination, generally a material which has a melting point which is lower, preferably from 20 to 50° C. lower, than those of the separator layer or layers Aa/Ab or the cathode (B) or anode C layer or layers or the separator layer or layers Aa/Ab and the cathode (B) and anode C layer or layers. The melting point of these materials is generally from 25 to 250° C., preferably from 50 to 200° C. and in particular from 70 to 180° C.

The bonding layer D can also comprise a solid III. The amounts of the solid correspond essentially to the amounts specified for the further layers A to C, in each case based on the material forming the bonding layer.

As such materials forming the bonding layer, it is possible to use all materials customarily used as adhesives. Of course, it has to be possible to apply these materials to the layers A and/or B by customary methods of layer formation, for example printing on, casting on, spraying on, extruding, doctor blade coating, etc.

Preference is given to using polymeric compounds as materials forming the bonding layer.

Mention may here be made of:

melt adhesives such as those based on ethylene-vinyl acetate copolymers which are generally additionally mixed with resins and/or waxes or paraffins so as to vary their melt flow index, those based on low molecular weight (co)polyethylene, atactic(co)polypropylene, ethylene-acrylic ester copolymers and styrene-butadiene and styrene-isoprene block copolymers, polyisobutylene and also poly(meth)acrylates and polyesters such as polyethylene terephthalate which can likewise in each case be mixed with plasticizers, in particular those mentioned herein, in order to vary their melt flow index;

adhesive plastisols which are essentially mixed from a dispersion of finely divided polyvinyl chloride in plasticizers and low molecular weight materials which are reactive under the action of heat and act as bonding agents, e.g. epoxy resin compounds, phenolic resins, etc;

heat-sealing adhesives such as those based on copolymers of vinyl chloride or vinylidene chloride, copolymers of vinylidene fluoride and hexafluoropropene (e.g. Kynarflex®), copolymers of vinyl acetate, polymethacrylic esters, polyurethanes and polyesters which can in turn likewise be mixed with other polymers or resins;

contact adhesives such as those based on natural rubber, synthetic rubber in admixture with resins and solutions of high molecular weight polyurethane elastomers, where the rubber components used are mostly polychloroprene, nitrile or SBR rubbers and the resins used are mainly phenolic resins, rosins and also hydrocarbon resins;

pressure sensitive adhesives such as those based on synthetic and natural rubbers, poly(meth)acrylic esters, polyvinyl ethers and polyisobutylene, in each case again in combination with modified natural resins, phenol-formaldehyde resins or hydrocarbon resins;

pressure sensitive dispersion adhesives such as those based on poly(meth)acrylic esters;

cold-curing, warm-curing (at from about 80 to about 100° C.) and hot-curing (at from about 100 to about 250° C.) reaction adhesives such as one-component or two-component polymerization adhesives, where the polymers used for the two-component polymerization adhesives are, in particular, synthetic rubbers such as polychloroprene, styrene-butadiene rubber, butyl rubber, polystyrene, polymethacrylates with accelerators such as those based on amines and, for example, benzoyl peroxide as hardener, and examples of one-component polymerization adhesives are those based on cyanoacrylate;

epoxy adhesives such as those based on condensation products of epichlorohydrin and polyhydric phenols such as bisphenol A;

aminoplastics; phenolic resin adhesives;

reactive polyurethane adhesives;

polymethylol compounds;

silicone adhesives; and polyimides and polyimidazoles such as polyaminamide and polybenzimidazole.

Specific examples are:

polyethylene oxide; polyvinyl ethers such as poly(vinyl methyl ether), poly(vinyl ethyl ether), poly(vinyl propyl ether), poly(vinyl butyl ether), poly(vinyl isobutyl ether); (co)polyacrylates and (co)polymethacrylates, with preference being given to those having relatively long alkyl chains, e.g. polybutyl(meth)acrylate or polyhexyl(meth)acrylate; polyvinylpyrrolidone; polyurethanes, where the abovementioned polyurethanes can likewise be used; wax-like (co)polyolefins such as polyethylene, polypropylene and polyisoprene waxes; rubber-like materials; polyisobutylene; and also mixtures of two or more thereof.

Further details regarding the materials which can be used according to the present invention in the bonding layer may be found in an article entitled "Kleben und Klebestoffe" (Chemie in unserer Zeit, number 4 (1980), and also Ullmann, Encyklopädie der technischen Chemie, 4th edition (1977), volume 14, pp. 227–268 and also the literature cited therein, whose contents relating to materials having adhesive properties are incorporated by reference into the present application.

In particular, the present invention provides composites having the following structure:

cathode layer B, bonding layer D, separator layer Aa, further bonding layer D which can be identical to or different from the first bonding layer D, and anode layer C, composites having the following structure:

cathode layer B, bonding layer D, separator layer Aa, further bonding layer D which can be identical to or different from the first bonding layer D, further layer of a conventional separator, third bonding layer D which can be identical to or different from the first and/or the second bonding layer D, and anode layer C, and also composites having the following structure:

cathode layer B, bonding layer D, further layer of a conventional separator, further bonding layer D which can be identical to or different from the first bonding layer D, separator layer Aa, third bonding layer D which can be identical to or different from the first and/or the second bonding layer D, and anode layer C, where the cathode layers B and/or the anode layers C are preferably firmly bound to a metal layer as electron collector.

The layer of a conventional separator which can likewise be used according to the present invention includes layers of all conventional separators, where in particular the following may be mentioned:

separators based on microporous polyolefin films whose microporosity is achieved by drawing and/or leaching out of additives such as waxes; these are commercially available, for example under the trade names Celgard®, Hipore®, and are described, inter alia, in EP-A 0 715 364, both of which are fully incorporated by reference into the present application; polyethylene and polypropylene films and films comprising blends of polyethylene or polypropylene with further polymers are likewise well suited;

microporous polytetrafluoroethylene (PTFE) films from Goretex as are described, for example, in EP-A 0 798 791 which is likewise incorporated by reference into the present application;

felts, fibers and nonwoven textile composites, known as "nonwovens", which can all be produced using fibrous polymer materials such as polyolefin, polyamide and polyester fibers;

films obtainable under the trade name Nafion®.

The composite of the present invention can further comprise a plasticizer. Suitable plasticizers of this type are described in PCT/EP98/06394 and PCT/EP98/06237.

Plasticizers which are preferably used are dimethyl carbonate, diethyl carbonate, dipropyl carbonate, diisopropyl carbonate, dibutyl carbonate, ethylene carbonate, propylene carbonate; ethers such as dibutyl ether, di-tert-butyl ether, dipentyl ether, dihexyl ether, diheptyl ether, dioctyl ether, dinonyl ether, didecyl ether, didodecyl ether, ethylene glycol dimethyl ether, ethylene glycol diethyl ether, 1-tert-butoxy-2-methoxyethane, 1-tert-butoxy-2-ethoxyethane, 1,2-dimethoxypropane, 2-methoxyethyl ether, 2-ethoxyethyl ether, oligoalkylene oxide ethers such as diethylene glycol dibutyl ether, dimethylene glycol tert-butyl methyl ether, triethylene glycol dimethyl ether, tetraethylene glycol dimethyl ether, γ-butyrolactone, dimethylformamide; hydrocarbons of the formula $C_nH_{2n+2}$ where $7<n<50$; organic phosphorus compounds, in particular phosphates and phosphonates such as trimethyl phosphate, triethyl phosphate, tripropyl phosphate, tributyl phosphate, triisobutyl phosphate, tripentyl phosphate, trihexyl phosphate, trioctyl phosphate, tris(2-ethylhexyl)phosphate, tridecyl phosphate, diethyl n-butyl phosphate, tris(butoxyethyl)phosphate, tris(2-methoxyethyl)phosphate, tris(tetrahydrofuryl)phosphate, tris(1H,1H,5H-octafluoropentyl)phosphate, tris(1H,1H-trifluoroethyl)phosphate, tris(2-(diethylamino)ethyl)phosphate, diethyl ethylphosphonate, dipropyl propylphosphonate, dibutyl butylphosphonate, dihexyl hexylphosphonate, dioctyl octylphosphonate, ethyl dimethyl phosphonoacetate, methyl diethyl phosphonoacetate, triethyl phosphonoacetate, dimethyl(2-oxopropyl)phosphonate, diethyl(2-oxopropyl)phosphonate, dipropyl(2-oxopropyl)phosphonate, ethyl diethoxyphosphinylformate, trimethyl phosphonoacetate, triethyl phosphonoacetate, tripropyl phosphonoacetate, tributyl phosphonoacetate. Trialkyl phosphates and carbonates are preferred.

The plasticizer content of the respective layer is, based on the mix present therein or the material making up the layer (polymeric binder plus cathode or anode material), from 0 to 200% by weight, preferably from 0 to 100% by weight and more preferably from 0 to 70% by weight.

The starting materials used for the respective layers can be dissolved or dispersed in an inorganic or preferably organic liquid diluent, where the resulting solution should have a viscosity of preferably from 100 to 50,000 mPas, and subsequently applied in a known manner, for example by spray coating, casting, dipping, spin coating, roller coating or letterpress, gravure, planographic or screen printing or by extrusion, if desired to a support material, i.e. shaped to form a film-like structure. Further processing can be carried out in a customary way, e.g. by removing the diluent and curing the materials.

Suitable organic diluents are aliphatic ethers, in particular tetrahydrofuran and dioxane, hydrocarbons, in particular hydrocarbon mixtures such as petroleum spirit, toluene and xylene, aliphatic esters, in particular ethyl acetate and butyl acetate, and ketones, in particular acetone, ethyl methyl ketone and cyclohexanone. It is also possible to use combinations of such diluents.

Suitable support materials are the materials customarily used for electrodes, preferably metals such as aluminum and copper. It is also possible to use coated glass substrates, in particular ITO-coated glass substrates or temporary intermediate supports such as films, in particular polyester films such as polyethylene terephthalate films. Such films can advantageously be provided with a release layer, preferably of polysiloxanes.

Likewise, the production of the individual films which then form the layers within the composite of the present invention can be carried out thermoplastically, for example by injection molding, melt casting, pressing, kneading or extrusion, if desired with a subsequent calendering step.

After film formation, volatile components such as solvents or plasticizers can be removed.

If crosslinking of the layers is desired, this can be carried out in a manner known per se, for example by irradiation with ionic or ionizing radiation, an electron beam, preferably at an acceleration voltage of from 20 to 2000 kV and a radiation dose of from 5 to 50 Mrad, UV or visible light, where, in a customary manner, an initiator such as benzil dimethyl ketal or 1,3,5-trimethylbenzoyl-triphenylphosphine oxide can be advantageously added in amounts of, in particular, at most 1% by weight based on the constituents to be crosslinked in the starting materials and the crosslinking can advantageously be carried out over a period of, in general, from 0.5 to 15 minutes, advantageously under inert gas such as nitrogen or argon; by thermal free-radical polymerization, preferably at above 60° C., where an initiator such as azobisisobutyronitrile can advantageously be added in amounts of, in general, at most 5% by weight, preferably from 0.05 to 1% by weight, based on the constituents to be crosslinked in the starting materials; by electrochemically induced polymerization; or by ionic polymerization, for example by acid-catalyzed cationic polymerization, where suitable catalysts are, first and foremost, acids, preferably Lewis acids such as $BF_3$ or, in particular, $LiBF_4$ or $LiPF_6$. Catalysts containing lithium ions, for example $LiBF_4$ or $LiPF_6$, can advantageously remain in the solid electrolyte or separator as conducting salt.

The layers described herein can also comprise a dissociable compound containing lithium cations, viz. a conducting salt, and, if desired, further additives such as, in particular, organic solvents, viz. an electrolyte.

Some or all of these materials can be added to the mixture during the production of the layer or can be introduced into the layer after production of the latter.

Conducting salts which can be used are the generally known conducting salts which are described, for example, in EP-A 0 096 629. According to the present invention, the conducting salt used is preferably $LiPF_6$, $LiBF_4$, $LiClO_4$, $LiAsF_6$, $LiCF_3SO_3$, $LiC(CF_3SO_2)_3$, $LiN(CF_3SO_2)_2$, $LiN(SO_2C_nF_{2n+1})_2$, $LiC[(C_nF_{2n+1})SO_2]_3$, $Li(C_nF_{2n+1})SO_3$, where n is in each case from 2 to 20, $LiN(SO_2F)_2$, $LiAlCl_4$, LiSiF$_6$, LiSbF$_6$ or a mixture of two or more thereof, with particular preference being given to using LiBF$_4$ or LiPF$_6$ as conducting salt.

These conducting salts are used in amounts of from 0.1 to 50% by weight, preferably from 0.1 to 20% by weight, in particular from 1 to 10% by weight, in each case based on the material forming the respective layer.

The layers forming the composite of the present invention generally have a thickness of from 5 to 500 μm, preferably from 10 to 500 μm, more preferably from 10 to 200 μm. The composite, which can have, for example, the form of a film, a cuboid, a cylinder, a zig-zag roll or a flat roll (e.g. with oval side faces), generally has a total thickness of from 100 μm to a few cm.

Furthermore, the present invention also provides a process for producing a composite according to the invention, which comprises joining the separator layer or layers Aa/Ab, the cathode layer or layers B, the anode layer or layers C and, if present, the bonding layer or layers D to one another by lamination by means of pressure and/or temperature. It should be ensured that, depending on the material used for the bonding layer, joining can always be carried out at room temperature or at temperatures up to 50☐ C. or by hot lamination.

In the hot or cold lamination, all customary techniques such as roller melt methods, simple pressing and extrusion lamination can be employed.

In the case of hot lamination, the temperatures used are generally from about 50☐ C. to about 250☐ C., preferably from about 700☐ C. to about 200☐ C. and more preferably from about 100☐ C. to about 180☐ C.

In detail, the following procedure may be employed:

Firstly, a bonding layer D is applied, for example, to a temporary support film, as defined above, which can later be removed or drawn off. The support film can also be one which does not have to be removed. Particular mention should be made of films of one of the above-defined conventional separators which either become ion-conducting as a result of swelling or are intrinsically ion-conductive or else contain micropores, e.g. the likewise above-defined microporous PE films, open-celled foam films, nonwovens and woven fabrics.

This first composite is subsequently transferred, e.g. by means of heat and/or pressure, to a cathode or anode layer B/C or a separator layer Aa/Ab. This gives a laminated composite which can be laminated with further layers as defined herein.

This procedure can be repeated as many times as necessary to obtain the desired composite of the present invention. In this way, it is possible to obtain a composite which comprises a cathode, an anode and a separator and can thus be transferred directly into a battery housing. For this purpose, the stack or roll obtained after the abovementioned shaping steps is bonded by action of heat and pressure, giving a firmly welded electrode stack or roll. The heat required for this can be generated, inter alia, by thermal radiation, ultrasound, friction, microwave energy. This stack or roll can then be introduced into a battery housing. If, in the production of the stack or roll, two electrode films coated on one side meet and as a result, for example, two terminal lead metals lie on top of one another, another bonding layer D can be introduced between these two films in order to produce a non-positive connection between these two layers as well.

DETAILED DESCRIPTION OF THE INVENTION

Furthermore, the present invention provides for the use of a composite, as defined above, for producing an electrochemical cell, in a sensor, an electrochromic window, a display, a capacitor or an ion-conducting film.

It additionally provides an electrochemical cell comprising a composite of the present invention or a combination of two or more thereof.

Suitable organic electrolytes for this purpose are the compounds discussed above under "plasticizers", with preference being given to using the customary organic electrolytes, preferably esters such as ethylene carbonate, propylene carbonate, dimethyl carbonate and diethyl carbonate or mixtures of such compounds.

The filling of such composites with an electrolyte and conducting salt can be carried out either before or preferably after bringing together the layers, if desired after provision of suitable collector electrodes, e.g. a metal foil, and even after introduction of the composite into a battery housing. The particular microporous structure of the layers when using the mixture of the present invention, in particular as a result of the presence of the above-defined solid in the respective layers, makes it possible for the electrolyte and the conducting salt to be taken up and the air in the pores to be displaced. Filling can be carried out at from 0☐ C. to about 100☐ C., depending on the electrolyte used. Filling with the electrolyte and the conducting salt is preferably carried out after introduction of the composite into the battery housing.

The electrochemical cells of the present invention can be used, in particular, as automobile batteries, instrument batteries, planar batteries, on-board batteries, batteries for static applications, batteries for electrotraction or polymer batteries.

EXAMPLES

Example 1

Firstly, an anode film for a lithium ion battery was produced. For this purpose, a 100 μm thick graphite layer consisting of 96% by weight of carbon and 4% by weight of polyisobutylene as binder on a 15 μm thick copper film as electron collector was coated with a 3 μm thick bonding layer consisting of 93.5% by weight of PEO (M$_w$=2,000,000 g/mol), 6% by weight of polyethylene glycol 600 dimethacrylate and 0.5% by weight of benzoyl peroxide on a 75 μm thick PET support film (whose surface had been provided with a 0.5 μm thick antiadhesion layer of silicone) at 90° C. in a hot laminating unit (minicalender having a heated pair of rubber rolls, diameter 2 cm) at an advance rate of 1 m/min.

A cathode film for a lithium ion battery was produced as follows:

A 200 μm thick layer consisting of 80% by weight of lithium cobalt oxide, 10% by weight of conductive carbon black and 10% by weight of polyvinylidene chloride as binder on a 15 μm thick aluminum foil as electron collector was coated with a 3 μm thick bonding layer consisting of 93.5% by weight of PEO (M$_w$=2,000,000), 6% by weight of polyethylene glycol 600 dimethacrylate and 0.5% by weight of benzoyl peroxide on a 75 μm thick PET support film (whose surface had been provided with a 0.5 μm thick antiadhesion layer of silicone) at 90° C. in a hot lamination unit (minicalender having a pair of heated rubber rolls, diameter 2 cm) at an advance rate of 1 m/min.

The separator film was produced as follows:

80 g of a wollastonite which had been hydrophobicized with methacrylsilane, had a mean particle size of 3 µm and whose aqueous dispersion had a pH of 8.5 was dispersed in 200 g of tetrahydrofuran (THF) using a high-speed stirrer. Subsequently, 15 g of a polyethylene oxide having a mean molecular weight (number average) of 2,000,000 (Polyox®, Union Carbide), 5 g of a methacrylic diester of a propylene oxide-ethylene oxide block copolymer (Pluriol® PE600, BASF Aktiengesellschaft) and 0.05 g of benzyl dimethyl ketal were added to the mixture. The mixture was then applied by means of a doctor blade to a siliconized release paper at 60° C., the solvent was removed over a period of 5 minutes and the dried coating was drawn off to give an approximately 25 □m thick film which was photocrosslinked under a nitrogen atmosphere by illumination for 10 minutes at a distance of 5 cm under a field of superactinic fluorescent tubes (TL 09, Philips).

The above-described separator layer was laid between a pair of the above-described anode and cathode films which each had the metal sides facing outward, in such a way that the anode and cathode films do not come into contact, in order to avoid a short circuit. This assembly was subsequently laminated together by means of the above-described minicalender at the advance rate indicated to give an electrode stack having a sandwich structure. The bonding layers were crosslinked by storage of this electrode stack at 120° C. for 60 minutes so as to give a compact, firmly bonded electrode stack.

This electrode stack was placed in a film bag and contacts were fixed to the electrode terminal lead films of the electrodes by friction welding and passed out from the bag. Subsequently, a 1 molar solution of $LiPF_6$ in ethylene carbonate/diethyl carbonate was introduced and the housing was welded shut.

The electrolyte was absorbed by the electrode stack over a period of about 30 minutes as a result of capillary forces, associated with displacement of the air previously present therein.

Example 2

Figure 1:
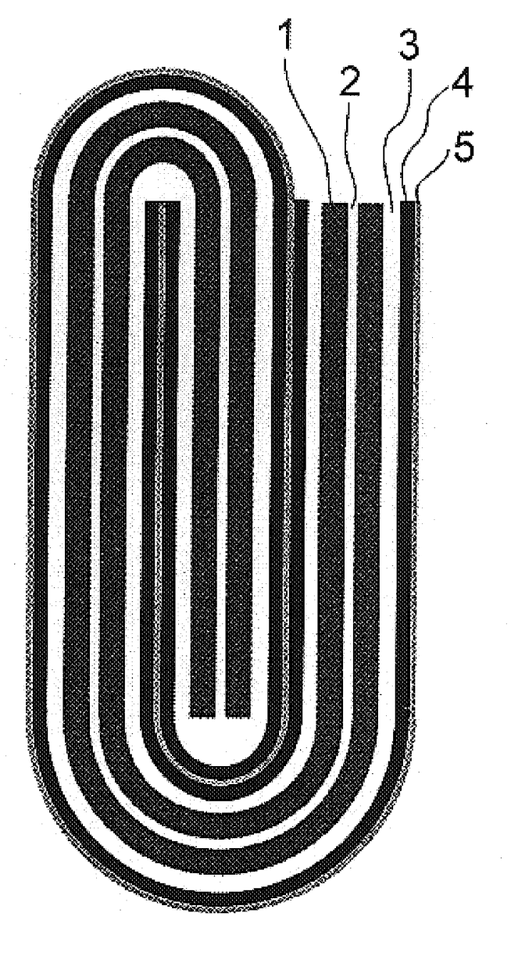
FIG. 1 shows a roll produced in this way and will be discussed further below with reference to Example 2 according to the present invention.

Firstly, an anode film and a cathode film are produced as described in Example 1. These are rolled together with the separator layer likewise described in Example 1 in such a way that a rectangular roll, as shown in FIG. 1, is formed. In the figure, the numerals correspond to the layers of:

1 Lithium cobaltate
2 Aluminum
3 Separator
4 Graphite
5 Copper

This roll was pressed in a heated press at 120° C. for 60 minutes. This resulted in hot lamination of the anode and cathode films with the solid electrolyte layer with simultaneous crosslinking of the bonding layers. This gave a compact, firmly bonded roll which could be used as a finished component in the construction of a lithium ion battery.

The electrode roll was subsequently placed in a cuboidal stainless steel housing, after contacts had previously been fixed to the terminal lead metal films of the anode and cathode films by friction welding and had been passed out from the housing. Subsequently, a 1 molar solution of $LiPF_6$ in EC/DEC was introduced and the housing was sealed by laser welding. The electrolyte introduced was absorbed by the electrode roll over a period of about 30 minutes as a result of capillary forces, with the air previously present therein being displaced.

Example 3

Firstly, an anode film was produced as described in Example 1.

Subsequently, a cathode film for a lithium ion battery was produced as follows:

A 200 µm thick layer consisting of 80% by weight of lithium cobalt oxide, 10% by weight of conductive carbon black and 10% by weight of polyvinylidene chloride as binder on a 15 µm thick aluminum foil as electron collector was coated with a 3 µm thick bonding layer of a polyvinylidene fluoride-hexafluoropropylene copolymer, where the content of hexafluoropropylene was 10% by weight, on a 75 µm thick PET film as support (whose surface had been provided with a 0.5 µm thick antiadhesion layer of silicone) at 140° C. in a hot lamination unit at an advance rate of 1 m/min. Subsequently, the anode and cathode films were rolled up from the middle together with an intercalated separator as described in Example 1 using the center rolling technique in such a way that the anode terminal lead metal (copper) did not come into contact with the cathode terminal lead metal (aluminum). The compact cylindrical, firmly bonded electrode roll obtained in this way was subsequently heated to 160° C. for 60 minutes. Owing to the resulting hot lamination of the electrodes with the solid electrolytes and the simultaneous crosslinking of the bonding layer between the electrodes and the solid electrolyte, a compact, firmly bonded electrode roll was obtained. This was placed in a cylindrical stainless steel housing, as described in Example 2, filled with an electrolyte and the housing was subsequently welded shut.

We claim:

1. A composite comprising
Aa) at least one separator layer Aa which comprises a mixture Ia, comprising a mix IIa consisting of
   a) from 1 to 95% by weight of a solid III, preferably a basic solid III, having a primary particle size of from 5 nm to 20 µm and
   b) from 5 to 99% by weight of a polymeric composition IV obtainable by polymerization of
      b1) from 5 to 100% by weight, based on the composition IV, of a condensation product V of
         α) at least one compound VI which is able to react with a carboxylic acid or a sulfonic acid or a derivative or a mixture of two or more thereof, and
         β) at least 1 mol per mol of the compound VI of a carboxylic acid or sulfonic acid VII which contains at least one free-radically polymerizable functional group, or a derivative thereof or a mixture of two or more thereof, and
      b2) from 0 to 95% by weight, based on the composition IV, of a further compound VIII having a mean molecular weight (number average) of at least 5000 and polyether segments in the main chain or a side chain, where the proportion by weight of the mix IIa in the mixture Ia is from 1 to 100% by weight, and the layer is free of an electro-conducting, electrochemically active compound, and
B) at least one cathode layer B which comprises an electron-conducting, electrochemically active compound which is able to release lithium ions on charging, C) at least one anode layer C which comprises an electron-conducting, electrochemical compound which is able to take up lithium ions on charging, and at least one bonding layer D, being formed by using polymeric compounds, where the bonding layer has a melting point which is lower than the melting point of the separator layer Aa or the cathode layer B or the anode layer C or the separator layer Aa and the cathode layer B and the anode layer C.

2. A composite comprising at least one separator layer Aa or at least one separator layer Ab or at least one separator layer Aa and at least one separator layer Ab, at least one cathode layer B, at least one anode layer C, and at least one bonding layer D each as defined in claim 1.

3. A composite as claimed in claim 1, wherein the bonding layer or layers D is/are a polyethylene oxide, polyvinyl ether, a polyacrylate a polymethacrylate, polyvinylpyrrolidone, a polyurethane, a wax-like (co) polyolefin, a rubber-like material polyisobutylene or a mixture of two or more thereof.

4. A composite as claimed in claim 1, wherein the bonding layer or layers D comprise(s) a solid III, a plasticizer or a combination of two or more thereof.

5. A composite as claimed in claim 1 having the following structure:

cathode layer B, bonding layer D, separator layer Aa, further bonding layer D which can be identical to or different from the first bonding layer D, and anode layer C, or cathode layer B, bonding layer D, separator layer Aa, further bonding layer D which can be identical to or different from the first bonding layer D, further layer of a conventional separator, third bonding layer D which can be identical to or different from the first and/or the second bonding layer D, and anode layer C, or cathode layer B, bonding layer D, further layer of a conventional separator, bonding layer D which can be identical to or different from the first bonding layer D, a separator layer Aa, a third bonding layer D which can be identical to or different from the first and/or the second bonding layer D, and anode layer C.

6. A composite as claimed in claim 5 which has a further layer of a conventional separator and further bonding layer D, where the layer of the conventional separator and the further bonding layer are located between the first bonding layer D and the separator layer Aa or between the further bonding layer D and the anode layer C.

7. A process for producing a composite as claimed in claim 1, which comprises joining the separator layer or layers Aa/Ab, the cathode layer or layers B, the anode layer or layers C and, if present, the bonding layer or layers D to one another by hot lamination.

8. A process as claimed in claim 7, wherein, in a first step, the separator layer or layers Aa/Ab, the cathode layer or layers B, the anode layer or layers C and, if present, the bonding layer or layers D are brought into contact with one another and are subjected to a shaping step, and are subsequently joined to one another by lamination under the action of heat and/or pressure.

9. Method of using a composite as claimed in claim 1 for producing an electrochemical cell, in a sensor, an capacitor or an ion-conducting film.

10. An electrochemical cell comprising a composite as claimed in claim 1 or a combination of two or more thereof.

11. Method of using the electrochemical cell as claimed in claim 10 as an automobile battery, instrument battery, planar battery, on-board battery, battery for static applications, battery for electrofraction or polymer battery.

12. A composite as claimed in claim 1, wherein the bonding layer D has a melting point which is from 20 to 50° C. lower than the melting point of the separator layer Aa or the cathode layer B or the anode layer C or the separator layer Aa and the cathode layer B and the anode layer C.

13. A composite comprising

Ab) at least one separator layer Ab which comprises a mixture Ib comprising a mix IIb consisting of a) from 1 to 95% by weight of solid III, preferably a basic solid, having a primary particle size of from 5 nm to 20 μm and b) from 5 to 99% by weight of Ia polymer IX obtainable by polymerization of b1) from 5 to 75% by weight, based on the polymer IX, of a free-radically polymerizable compound X which is different from the carboxylic acid or the sulfonic acid VII or a derivative thereof, or a mixture of two or more thereof, and b2) from 25 to 95% by weight, based on the polymer IX of a further compound VIII having a mean molecular weight (number average) of at least 5000 and polyether segments in the main chain or a side chain, where the proportion by weight of the mix IIb in the mixture Ib is from 1 to 100% by weight and the layer is free of an electron-conducting, electrochemically active compound, and at least one cathode layer B, at least one anode layer C and at least one bonding layer D, each as defined in claim 14, where the bonding layer has a melting point which is lower than the melting point of the separator layer Ab or the cathode layer B or the anode layer C or the separator layer Ab and the cathode layer B and the anode layer C.

14. A composite comprising at least one separator layer Aa or at least one separator layer Ab or at least one separator layer Aa and at least one separator layer Ab, at least one cathode layer B, at least one anode layer C, and at least one bonding layer D each as defined in claim 13.

15. A composite as claimed in claim 13, wherein the bonding layer or layers D is/are a polyethylene oxide, a polyvinyl ether, a polyacrylate, a polymethacrylate, polyvinylpyrrolidone, a polyurethane, a wax-like (co) polyolefin, a rubber-like material, polyisobutylene or a mixture of two or more thereof.

16. A composite as claimed in claim 13, wherein the bonding layer or layers D comprise(s) a solid III, a plasticizer or a combination of two or more thereof.

17. A composite as claimed in claim 13 having the following structure:

cathode layer B,
bonding layer D,
separator layer Aa,
further bonding layer D which can be identical to or different from the first bonding layer D, and
anode layer C, or
cathode layer B,
bonding layer D,
separator layer Aa,
further bonding layer D which can be identical to or different from the first bonding layer D,
further layer of a conventional separator,
third bonding layer D which can be identical to or different from the first and/or the second bonding layer D, and
anode layer C, or
cathode layer B,
bonding layer D,
further layer of a conventional separator,
bonding layer D which can be identical to or different from the first bonding layer D,
a separator layer Aa,
a third bonding layer D which can be identical to or different from the first and/or the second bonding layer D,
and anode layer C.

18. A composite as claimed in claim 17 which has a further layer of a conventional separator and a further bonding layer D, where the layer of the conventional separator and the further bonding are located between the first bonding layer D and the separator layer Aa or between the further bonding layer D and the anode layer C.

19. A process for producing a composite as claimed in claim 13 which comprises joining the separator layer or layers Aa/Ab, the cathode layer or layers B, the anode layer or layers C and, if present, the bonding layer or layers D to one another by hot lamination.

20. A process as claimed in claim 19, wherein, in a first step, the separator layer or layers Aa/Ab, the cathode layer or layers B, the anode layer or layers C and, if present, the bonding layer or layers D are brought into contact with one another and are subjected to a shaping step, and are subsequently joined ton one another by lamination under the action of heat and/or pressure.

21. Method of using a composite as claimed in claim 13 for producing an electrochemical cell, in a sensor, an electrochromic window, a display, a capacitor or an ion-conducing film.

22. An electrochemical cell comprising a composite as claimed in claim 13 or a combination of two or more thereof.

23. Method of using the electrochemical cell as claimed in claim 22 as an automobile batter, instrument battery, planar battery, on-board battery, battery for static applications, battery for electrotraction or polymer battery.

24. A composite as claimed in claim 13, wherein the bonding layer D has a melting point which is from 20 to 50° C. lower than the melting point of the separator layer Ab or the cathode layer B or the anode layer C or the separator layer Ab and the cathode layer B and the anode layer C.

* * * * *